(12) United States Patent
Grunlan et al.

(10) Patent No.: US 10,150,142 B2
(45) Date of Patent: Dec. 11, 2018

(54) COATING METHOD FOR FORMING FLAME RETARDANT SUBSTRATE

(71) Applicant: The Texas A&M University System, College Station, TX (US)

(72) Inventors: Jaime C. Grunlan, College Station, TX (US); Marcus Leistner, College Station, TX (US); Merid M. Haile, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 15/545,803

(22) PCT Filed: Jan. 28, 2016

(86) PCT No.: PCT/US2016/015289
§ 371 (c)(1),
(2) Date: Jul. 24, 2017

(87) PCT Pub. No.: WO2016/123295
PCT Pub. Date: Aug. 4, 2016

(65) Prior Publication Data
US 2018/0022939 A1 Jan. 25, 2018

Related U.S. Application Data

(60) Provisional application No. 62/108,893, filed on Jan. 28, 2015.

(51) Int. Cl.
| | | |
|---|---|---|
| *B05D 5/00* | (2006.01) |
| *B05D 7/00* | (2006.01) |
| *C09D 5/18* | (2006.01) |
| *C09D 7/40* | (2018.01) |
| *C09K 21/04* | (2006.01) |
| *C09K 21/10* | (2006.01) |
| *C09K 21/12* | (2006.01) |
| *D06M 11/72* | (2006.01) |
| *C09D 179/02* | (2006.01) |
| *D06M 15/61* | (2006.01) |
| *C09D 201/00* | (2006.01) |
| *C08K 3/32* | (2006.01) |
| *D06M 101/06* | (2006.01) |

(52) U.S. Cl.
CPC ............... *B05D 7/54* (2013.01); *B05D 5/00* (2013.01); *B05D 7/52* (2013.01); *B05D 7/58* (2013.01); *C09D 5/18* (2013.01); *C09D 5/185* (2013.01); *C09D 7/40* (2018.01); *C09D 179/02* (2013.01); *C09D 201/00* (2013.01); *C09D 201/005* (2013.01); *C09K 21/04* (2013.01); *C09K 21/10* (2013.01); *C09K 21/12* (2013.01); *D06M 11/72* (2013.01); *D06M 15/61* (2013.01); *B05D 2505/00* (2013.01); *D06M 2101/06* (2013.01); *D06M 2200/30* (2013.01)

(58) Field of Classification Search
CPC ... B05D 7/52; B05D 5/00; B05D 7/54; B05D 7/58; B05D 2505/00; C09K 21/04; C09K 21/10; C09K 21/12; C09D 5/185; C09D 179/02; C09D 7/40; C09D 201/005; C09D 201/00; C09D 5/18; D06M 11/72; D06M 15/16; D06M 2101/06; D06M 2200/30
USPC .............. 106/15.05, 18.14, 18.21; 427/407.1
See application file for complete search history.

(56) References Cited

U.S. PATENT DOCUMENTS 2,971,931 A * 2/1961 Glade .................... D06M 11/70
427/394
2012/0295031 A1* 11/2012 Grunlan .................. C09D 7/61
427/407.2

* cited by examiner

*Primary Examiner* — William P Fletcher, III
(74) *Attorney, Agent, or Firm* — Tumey L.L.P.

(57) ABSTRACT

A method includes coating a substrate to provide a flame resistant substrate. In an embodiment, the method includes preparing an aqueous solution. The aqueous solution comprises a phosphate material, a cationic material, and a water. The method further includes exposing the substrate to the aqueous solution to produce a coating on the substrate. The coating includes the cationic material and the phosphate material. The method also includes exposing the coating on the substrate to a melamine solution.

20 Claims, 3 Drawing Sheets

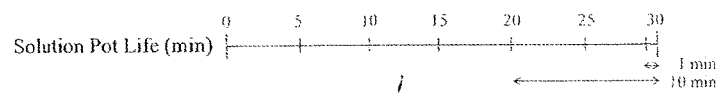
FIG 1A
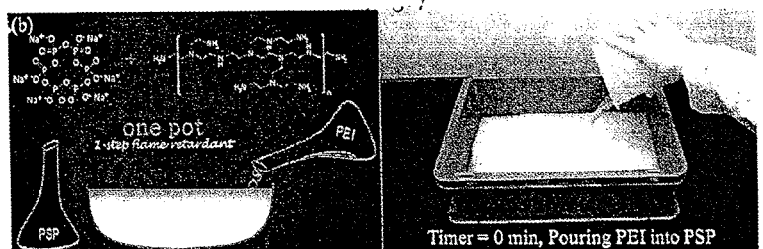
FIG 1B  FIG 1C  FIG 1D  FIG 1E
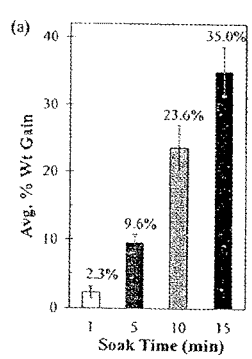
FIG 2A
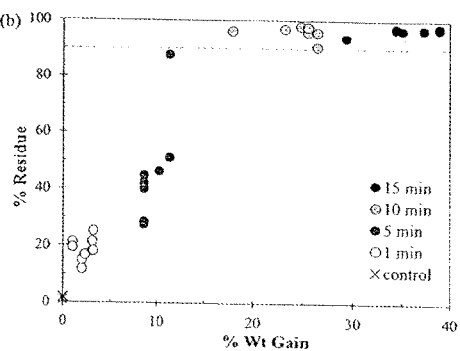
FIG 2B Images Post Vertical Flame Testing

COATING METHOD FOR FORMING FLAME RETARDANT SUBSTRATE

CROSS-REFERENCE TO RELATED APPLICATIONS

This application claims the benefit of U.S. Provisional Application No. 62/108,893, filed Jan. 28, 2015, which is incorporated by reference in its entirety.

STATEMENT REGARDING FEDERALLY SPONSORED RESEARCH OR DEVELOPMENT

Not applicable.

BACKGROUND

Field of the Disclosure

This disclosure relates to the field of coatings and more specifically to the field of flame retardant coatings for various substrates such as foam or fabric.

Background

Fire-related occurrences have caused widespread property damage and injuries. It is well known that a wide range of commonly used materials are flammable. To reduce the hazards from such flammable materials, flame retardants have been developed. Such flame retardants include halogenated materials. Halogenated materials typically include brominated compounds and phosphinated compounds. Drawbacks to such halogenated materials include the potential for harm to the environment and humans. For instance, such halogenated materials may form toxins. Other drawbacks include a lack of durability that may be typical in some instances to the brominated compounds.

The use of nanoparticles has been developed to overcome such drawbacks. However, drawbacks to use of nanoparticles include increased processing viscosity and modulus of the final polymer material, such as foam or fabric. Further drawbacks include inadequate flame suppression and melt-dripping.

Consequently, there is a need for an improved fire retardant polymer material. There is a further need for improved fire retardant coatings for foam, fabric and other substrate materials.

BRIEF SUMMARY OF SOME OF THE PREFERRED EMBODIMENTS

These and other needs in the art are addressed in embodiments by a method for coating a substrate to provide a flame resistant substrate. The method includes preparing an aqueous solution. The aqueous solution includes a phosphate material, a cationic material, and a water. The method also includes exposing the substrate to the aqueous solution to produce a coating on the substrate. The coating includes the cationic material and the phosphate material. The coating also includes exposing the coating on the substrate to an amine (or amide) rich solution.

The foregoing has outlined rather broadly the features and technical advantages of the present disclosure in order that the detailed description of the disclosure that follows may be better understood. Additional features and advantages of the disclosure will be described hereinafter that form the subject of the claims of the disclosure. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

For a detailed description of the preferred embodiments of the disclosure, reference will now be made to the accompanying drawings in which:

FIG. 1(a) illustrates a diagram of the time line for the one pot solution life and example submission times for fabrics;

FIG. 1(b) illustrates a schematic of a one pot assembly of polyelectrolyte complexes onto cotton fabric;

FIG. 1(c) illustrates a still shot of a one pot coating process;

FIG. 1(d) illustrates a still shot of a one pot coating process;

FIG. 1(e) illustrates a still shot of a one pot coating process;

FIG. 2(a) illustrates a PSP/PEI weight gain (average weight of five coated fabrics) as a function of soak time;

FIG. 2(b) illustrates % residue remaining after vertical flame testing as a function of weight gain (expressed as percent of total fabric weight);

DETAILED DESCRIPTION OF THE PREFERRED EMBODIMENTS

Figure 3:
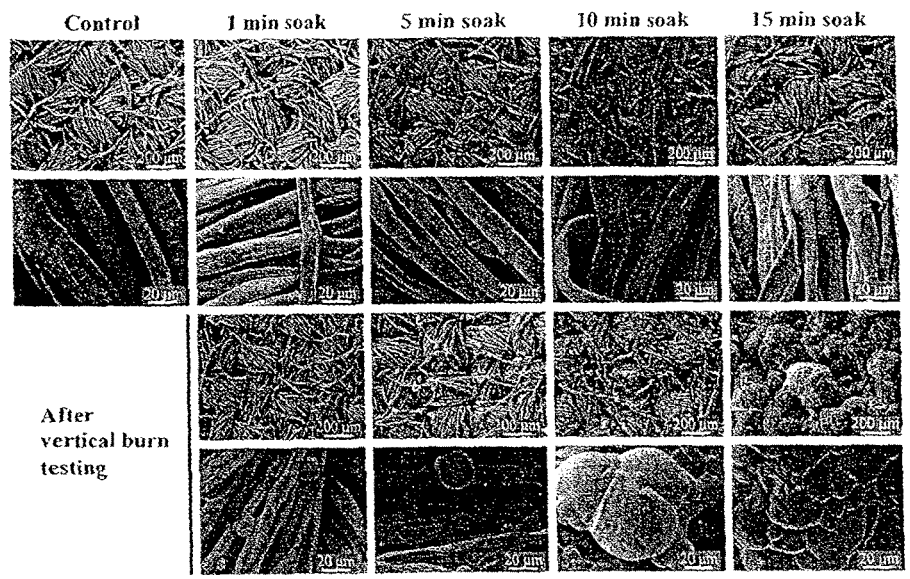
FIG. 3 illustrates SEM images of uncoated fabric and fabric soaked in the PSP/PEI one pot solution for 1, 5, 10, and 15 minutes before (top) and after vertical flame testing (bottom)

In an embodiment, a thin film coating method provides a substrate with a fire retardant coating by depositing a nanocoating on the substrate. The nanocoating has at least two electrolytes. In embodiments, the electrolytes include at least one cationic material, at least one phosphate material, and at least one amine (or amide) rich material. Other amine (or amide) rich molecules may be included, such as, for example, melamine, guanidine (and salts thereof), cyanamide, guanamines (e.g., benzaguanamine), or any combinations thereof. In some embodiments, the nanocoating also includes at least one anionic material. In embodiments, the nanocoating is between about 10 nanometers and about 1,000 nanometers thick, alternatively between about 40 nanometers and about 500 nanometers.

Any desirable substrate may be coated with the thin film coating method. In embodiments, the substrate includes foam, fabric, leather, vinyl compounds, plastic, glass, ceramic, metal, wood, carpet, hook and loop fasteners, non-foam padding, lapis, ducts, or any combinations thereof. Any desirable foam may be used as the substrate. Without limitation, examples of suitable foams include polyurethane foam and polystyrene foam. The fabric used may include any desirable type of fabric. Without limitation, examples of suitable fabrics include wool, linen, cotton, polyester-cotton blends, and nylon-cotton blends. In an embodiment, the substrate includes hook and loop fasteners (i.e., VELCRO®, which is a registered trademark of Velcro Industries, B.V.). In some embodiments, the substrate is a carpet or the like. It is to be understood that a carpet refers to a woven floor covering having an upper pile layer attached to a backing. In an embodiment, the substrate is a duct or a system of ducts (e.g., ductwork). In some embodiments, the substrate is wood. In embodiments, the wood includes wood products such as particle board. Without limitation, an example of wood is balsa wood. Non-foam padding refers to material that provides cushion against contact and that does not include foam. Without limitation, examples of non-foam padding include cotton, feathers, and the like. The substrate may be positively charged, negatively charged, or neutral.

The phosphate material includes materials having molecules with a phosphate ion. Examples of suitable phosphate materials include polysodium phosphate (PSP), ammonium phosphate, ammonium polyphosphate, sodium hexametaphosphate, or any combinations thereof.

The positive charge (cationic) material comprises cationic materials. The cationic materials comprise polymers, colloidal particles, nanoparticles, nitrogen-rich molecules, or any combinations thereof. The polymers include cationic polymers, polymers with hydrogen bonding, or any combinations thereof. Without limitation, examples of suitable cationic polymers include branched polyethylenimine (BPEI), cationic polyacrylamide, cationic poly diallyldimethylammonium chloride (PDDA), poly (melamine-co-formaldehyde), polymelamine, copolymers of polymelamine, polyallylamine (or salts thereof), polyvinylpyridine, copolymers of polyvinylpyridine, or any combinations thereof. Without limitation, examples of suitable polymers with hydrogen bonding include polyethylene oxide, polyvinylpyrrolidone, or any combinations thereof. In addition, without limitation, colloidal particles include organic and/or inorganic materials. Further, without limitation, examples of colloidal particles include clays, layered double hydroxides (LDH), inorganic hydroxides, silicon based polymers, polyoligomeric silsesquioxane, carbon nanotubes, graphene, or any combinations thereof. Without limitation, examples of suitable layered double hydroxides include hydrotalcite, magnesium LDH, aluminum LDH, or any combinations thereof. Without limitation, an example of a nitrogen-rich molecule is melamine. In alternative embodiments, cationic materials are neutral.

The amine (or amide) rich material includes any amine and/or amide soluble in an aqueous solution. Without limitation, amine (or amide) rich materials include melamine; guanidine, salts thereof, or any combinations thereof; cyanamide; guanamines such as, without limitation, benzaguanamine; or any combinations thereof. The melamine material includes any melamine soluble in an aqueous solution. Without limitation, examples of melamine include melamine salts, melamine hydrochloric acid, or any combinations thereof. Melamine salts include melamine acetate, melamine monoacetate, melamine polyphosphate, melamine diphosphate, melamine orthophosphate, melamine borate, melamine phthalate, or any combinations thereof.

In some embodiments, the electrolytes also include negative charged material. The negative charged (anionic) material comprises layerable materials. The layerable materials include anionic polymers, colloidal particles, sulfated molecules, boronic acid, boron containing acids, or any combinations thereof. Without limitation, examples of suitable anionic polymers include branched polystyrene sulfonate (PSS), polymethacrylic acid (PMAA), polyacrylic acid (PAA), or any combinations thereof. In addition, without limitation, colloidal particles include organic and/or inorganic materials. Further, without limitation, examples of colloidal particles include clays, colloidal silica, inorganic hydroxides, silicon based polymers, polyoligomeric silsesquioxane, carbon nanotubes, graphene, or any combinations thereof. Any type of clay suitable for use in an anionic solution may be used. Without limitation, examples of suitable clays include sodium montmorillonite, hectorite, saponite, Wyoming bentonite, halloysite, vermiculite, or any combinations thereof. In an embodiment, the clay is sodium montmorillonite. Any inorganic hydroxide that may provide flame retardancy may be used. In an embodiment, the inorganic hydroxide includes aluminum hydroxide, magnesium hydroxide, or any combinations thereof. Sulfated molecules refer to molecules with a sulfate ion. Examples of suitable sulfated molecules include ammonium sulfate, polyethylene glycol sulfate, poly vinyl sulfonic acid, sodium sulfate, or any combinations thereof. Any boronic acid suitable for use in an anionic layer may be used. In an embodiment, the boronic acid is 2-methylpropylboronic acid, 2-hydroxy-3-methylphenyl boronic acid, polymer-bound boronic acid, or any combinations thereof. Any boron containing acid suitable for use in an anionic layer may be used. In an embodiment, the boron containing acid is boric acid. In embodiments, any salt suitable for use in an anionic layer may be used. In embodiments, anionic materials may include a phosphate-rich salt, a sulfate-rich salt, or any combinations thereof. In alternative embodiments, layerable materials are neutral.

In embodiments, the coating is deposited on the substrate by any suitable method. In embodiments, the suitable method includes any suitable water-based coating technology. Embodiments include depositing the coating (e.g., via exposure to the aqueous solution and then the melamine solution) on the substrate by any suitable liquid deposition method. Without limitation, examples of suitable methods include bath coating, spray coating, slot coating, spin coating, curtain coating, gravure coating, reverse roll coating, knife over roll (i.e., gap) coating, metering (Meyer) rod coating, air knife coating, or any combinations thereof. Bath coating includes immersion or dip in the aqueous solution or the melamine solution. In an embodiment, the coating is deposited by bath in the aqueous solution or the melamine solution. In other embodiments, the coating is deposited by spray of the aqueous solution or the melamine solution.

In an embodiment, the thin film coating method is carried out at any desired temperature. In embodiments, the thin film coating method is carried out with the aqueous solution at a temperature from about ambient temperature to about 350° C., alternatively from about ambient temperature to about 200° C., and alternatively from about 50° C. to about 350° C., further alternatively from about 100° C. to about 350° C., and further alternatively from about 50° C. to about 200° C., and alternatively from about 100° C. to about 200° C. In an embodiment, the thin film coating method is carried out with the aqueous solution at ambient temperature.

In an embodiment, the thin film coating method includes preparing the aqueous solution. The aqueous solution may be prepared by any suitable method. In embodiments, the aqueous solution includes the cationic materials, the phosphate materials, and water. In an embodiment, the cationic materials and the phosphate materials may be dissolved in a mixed solvent, in which one of the solvents is water and the other solvent is miscible with water (e.g., water, methanol, and the like). The phosphate materials and the cationic materials may be dissolved in the water at about the same time or separately from each other. Any suitable water may be used. In embodiments, the water is deionized water. In some embodiments, the aqueous solution may include from about 0.01 wt. % cationic materials to about 1.50 wt. % cationic materials, alternatively from about 0.05 wt. % cationic materials to about 1.50 wt. % cationic materials, and alternatively from about 0.01 wt. % cationic materials to about 1.00 wt. % cationic materials, alternatively from about 0.01 wt. % cationic materials to about 30 wt. % cationic materials, further alternatively from about 0.05 wt. % cationic materials to about 30.0 wt. % cationic materials, and further alternatively from about 1.0 wt. % cationic materials to about 15.0 wt. % cationic materials, and alternatively from about 1.0 wt. % cationic materials to about 10.0 wt. % cationic materials. In further embodiments, the aqueous solution may include from about 0.01 wt. % phosphate materials to about 1.50 wt. % phosphate materials, alternatively from about 0.05 wt. % phosphate materials to about 1.50 wt. % phosphate materials, and alternatively from about 0.01 wt. % phosphate materials to about 1.00 wt. % phosphate materials, alternatively from about 0.01 wt. % phosphate materials to about 30 wt. % phosphate materials, further alternatively from about 0.05 wt. % phosphate materials to about 30.0 wt. % phosphate materials, and further alternatively from about 1.0 wt. % phosphate materials to about 15.0 wt. % phosphate materials, and alternatively from about 1.0 wt. % phosphate materials to about 10.0 wt. % phosphate materials. In embodiments in which the nanocoating includes anionic materials, the aqueous solution may include from about 0.01 wt. % anionic materials to about 1.50 wt. % anionic materials, alternatively from about 0.05 wt. % anionic materials to about 1.50 wt. % anionic materials, and alternatively from about 0.01 wt. % anionic materials to about 1.00 wt. % anionic materials, alternatively from about 0.01 wt. % anionic materials to about 30 wt. % anionic materials, further alternatively from about 0.05 wt. % anionic materials to about 30.0 wt. % anionic materials, and further alternatively from about 1.0 wt. % anionic materials to about 15.0 wt. % anionic materials, and alternatively from about 1.0 wt. % anionic materials to about 10.0 wt. % anionic materials. In embodiments, the substrate may be exposed (i.e., dipped in the aqueous solution) to the aqueous solution containing the cationic materials and the phosphate materials for any suitable period of time to produce the nanocoating. In embodiments, the substrate is exposed to the aqueous solution from about 1 second to about 24 hours, alternatively from about 1 seconds to about 10 minutes, and alternatively from about 10 seconds to about 10 minutes, and further alternatively from about 1 second to about 1 hour, alternatively from about 30 seconds to about 10 minutes. Without being limited by theory, the exposure time of the substrate to the aqueous solution may affect the thickness of the cationic layer. For instance, increasing the concentration of the phosphate materials and cationic materials as well as the exposure time may result in a thicker nanocoating. In an embodiment, the thin film coating method includes a single exposure (i.e., dip) of the substrate to the aqueous solution. In alternative embodiments, the thin film coating method includes multiple exposures (i.e., multiple dips) in the same or a different aqueous solution until the desired nanocoating is achieved.

In embodiments, after the desired exposure of the substrate to the aqueous solution, the substrate is exposed to a melamine solution. The melamine solution may be prepared by any suitable method. In embodiments, the melamine solution includes the melamine materials and water. In an embodiment, the melamine materials may be dissolved in a mixed solvent, in which one of the solvents is water and the other solvent is miscible with water (e.g., water, methanol, and the like). Any suitable water may be used. In embodiments, the water is deionized water. In some embodiments, the aqueous solution may include from about 0.01 wt. % melamine materials to about 1.50 wt. % melamine materials, alternatively from about 0.05 wt. % melamine materials to about 1.50 wt. % melamine materials, and alternatively from about 0.01 wt. % melamine materials to about 1.00 wt. % melamine materials, alternatively from about 0.01 wt. % melamine materials to about 30 wt. % melamine materials, further alternatively from about 0.05 wt. % melamine materials to about 30.0 wt. % melamine materials, alternatively from about 0.1 wt. % melamine materials to about 5.0 wt. % melamine materials, and alternatively from about 0.1 wt. % melamine materials to about 10.0 wt. % melamine materials, and further alternatively from about 1.0 wt. % melamine materials to about 15.0 wt. % melamine materials, and alternatively from about 1.0 wt. % melamine materials to about 10.0 wt. % melamine materials. In embodiments, the coated substrate may be exposed (i.e., dipped in the melamine solution) to the melamine solution containing the melamine materials for any suitable period of time to produce the nanocoating. In embodiments, the substrate is exposed to the melamine solution from about 1 second to about 24 hours, alternatively from about 1 seconds to about 10 minutes, and alternatively from about 10 seconds to about 10 minutes, and further alternatively from about 1 second to about 1 hour, alternatively from about 30 seconds to about 10 minutes. In an embodiment, the thin film coating method includes a single exposure (i.e., dip) of the coated substrate to the melamine solution. In alternative embodiments, the thin film coating method includes multiple exposures (i.e., multiple dips) in the same or a different melamine solution until the desired nanocoating is achieved. Exposure of the coated substrate to the melamine solution may be carried out at ambient temperature or at an elevated temperature. In an embodiment, the exposure is carried out at a temperature from about ambient temperature to about 70° C., alternatively from about ambient temperature to about 100° C.

In an embodiment, the thin film coating method provides a coating with an active ingredient (e.g., melamine polyphosphate) by an on-the-substrate formation of melamine polyphosphate by a chemical reaction of a melamine (e.g., melamine monoacetate) with a phosphate (e.g., a polyphosphate such as ammonium polyphosphate or sodium hexametaphosphate).

The coated substrate may have any amount of nanocoating suitable to reduce or prevent flammability. In embodiments, the coated substrate has between about 1.0 wt. % and about 99.0 wt. % nanocoating, alternatively between about 1.0 wt. % and about 25.0 wt. % nanocoating, further alternatively between about 5 wt. % and about 25 wt. %, and alternatively between about 5.0 wt. % and about 12.5 wt. % nanocoating. Without limitation, the wt. % of coating desired may depend upon the substrate. Further, without limitation, different substrates may have different wt. % of coating to reduce or prevent flammability. For instance, embodiments include a cotton substrate having a nanocoating wt. % from about 1 wt. % to about 30 wt. %, and alternatively from about 5 wt. % to about 25 wt. %, and further alternatively from about 5 wt. % to about 20 wt. %.

In some embodiments, the thin film coating method includes rinsing the coated substrate after exposure to the aqueous solution and before exposure to the melamine solution. For instance, after the coated substrate is removed from exposure to the cationic and phosphate materials (i.e., removed from the bath), the coated substrate is rinsed. The rinsing is accomplished by any rinsing liquid suitable for removing all or a portion of ionic liquid from the coated substrate. In embodiments, the rinsing liquid includes deionized water, methanol, distilled water, or any combinations thereof. In an embodiment, the rinsing liquid is deionized water. The coated substrate may be rinsed for any suitable period of time to remove all or a portion of the ionic liquid (e.g., aqueous solution). In an embodiment, the coated substrate is rinsed for a period of time from about 5 seconds to about 5 minutes.

In embodiments, the thin film coating method includes drying the coated substrate after exposure to the aqueous solution and before exposure to the melamine solution. In some embodiments, the coated substrate is not dried before exposure to the melamine solution. For instance, after the coated substrate is removed from exposure to the cationic and phosphate materials, the coated substrate is dried. The drying may be accomplished by any suitable method. In embodiments, the drying includes applying a drying gas to the coated substrate, heating the coated substrate, allowing the coated substrate to dry by ambient air, applying pressure to the coated substrate, or any combination thereof. The drying gas may include any gas suitable for removing all or a portion of liquid from the coated substrate. In embodiments, the drying gas includes air, nitrogen, or any combinations thereof. In an embodiment, the drying gas is air. In some embodiments, the air is filtered air. The coated substrate may be dried by drying gas for any suitable period of time to remove all or a portion of the liquid. In an embodiment, the coated substrate is dried by drying gas for a period of time from about 5 seconds to about 20 minutes, and alternatively from about 15 minutes to about 25 minutes, and further alternatively from about 5 seconds to about 500 seconds. Heating the coated substrate may be accomplished by any suitable means. In embodiments, heating the coated substrate includes applying a heat source to the coated substrate. Any suitable heat source may be applied. In an embodiment, the coated substrate is disposed in an oven for a time sufficient time and temperature to remove all or a portion of the liquid (e.g., aqueous solution). In embodiments, the coated substrate is heated at a temperature from about 50° C. to about 200° C., alternatively from about 50° C. to about 100° C., and alternatively from about 100° C. to about 200° C., and further alternatively from about 70° C. to about 200° C., and alternatively from about 70° C. to about 100° C., and alternatively from about 50° C. to about 70° C. Applying pressure to the coated substrate may be accomplished by any suitable means. In alternative embodiments, applying pressure includes pressing the coated substrate, twisting the coated substrate, squeezing the coated substrate, or any combination thereof. In an embodiment in which the coated substrate is rinsed after the exposure step, the coated substrate is dried after rinsing.

In some embodiments, the coated substrate is not rinsed or dried before exposure to the melamine solution.

In an embodiment, the coated substrate is exposed to a buffer solution after exposure to the melamine solution. The buffer solution includes any solution suitable to reduce the pH of the coated substrate. In embodiments, the buffer solution includes acetic acid, citric acid, maleic acid, hydrochloric acid, sulfuric acid, or any combinations thereof. In an embodiment, the buffer solution reduces the pH to about 6 or less, alternatively about 2 or less. Without limitation, the buffer solution may cause complexation of the polyelectrolytes. Alternatively, the buffer solution may be included in the amine (or amide) rich solution, for example, the amine (or amide) rich solution may be the buffer solution. This may allow the coated substrate to be exposed to the amine (or amide) rich solution and the buffer solution in a single exposure step.

In embodiments, the coated substrate is cured after removal from exposure to the buffer solution. Curing may be accomplished by any suitable means. Curing includes applying a heat source to the coated substrate. In some embodiments, the thin film coating method does not include a buffer solution but instead includes curing the coated substrate after exposure to the melamine solution. In other embodiments, the thin film coating method does not include exposure to a melamine solution. Curing includes applying heat to the coated substrate. In embodiments, curing the coated substrate includes applying a heat source to the coated substrate. Any suitable heat source may be applied. In an embodiment, the coated substrate is disposed in an oven for a time sufficient time and temperature to remove all or a portion of the liquid (e.g., melamine solution). In embodiments, the coated substrate is heated at a temperature from about 50° C. to about 200° C., alternatively from about 50° C. to about 100° C., and alternatively from about 100° C. to about 200° C., and further alternatively from about 70° C. to about 200° C., and alternatively from about 70° C. to about 100° C., and alternatively from about 50° C. to about 70° C.

In some embodiments, additives may be added to substrate in the coating. In embodiments, the additives may be mixed in the aqueous bath with the phosphate and cationic materials and/or with the melamine solution. The additives may be used for any desirable purpose. For instance, additives may be used for protection of the substrate against ultraviolet light or for abrasion resistance. For ultraviolet light protection, any material suitable for protection against ultraviolet light and for use in the coating may be used. In an embodiment, examples of suitable additives for ultraviolet protection include titanium dioxide. For abrasion resistance, any additive suitable for abrasion resistance and for use in the coating may be used. In embodiments, examples of suitable additives for abrasion resistance include crosslinkers. Crosslinkers may be any chemical that reacts with any matter in the coating. In embodiments, the crosslinkers include any curable crosslinker suitable for use in the nanocoating. Examples of crosslinkers include bromoalkanes, aldehydes, carbodiimides, amine active esters, acrylates, epoxides, or any combinations thereof. In embodiments, the aldehydes include glutaraldehyde, di-aldehyde, or any combination thereof. In embodiments, the aldehydes include glutaraldehyde. In an embodiment, the carbodiimide is 1-ethyl-3-(3-dimethylaminopropyl) carbodiimide (EDC). Embodiments include the amine reactive esters including N-hydroxysuccinimide esters, imidoesters, or any combinations thereof. In an embodiment, the epoxide is isocyanate epoxide. The crosslinkers may be used to crosslink the anionic materials and the cationic materials (to one another or to themselves). In some embodiments, the additives are added in a separate exposure (i.e., separate bath, spray or the like) from the exposure that provided the coating to the substrate. Without limitation, crosslinking provides washability and durability to the nanocoating.

In some embodiments, the pH of the aqueous solution is adjusted. Without being limited by theory, reducing or increasing the pH of the aqueous solution increases or decreases growth of the coating. Further, without being limited by theory, the coating growth may be reduced because the aqueous solution may have a high charge density at altered pH values, which may cause the polymer backbone to repel itself into a flattened state. In some embodiments, the pH is increased to increase the coating growth and produce a thicker coating. Without being limited by theory, a lower charge density in the cationic mixture provides an increased coiled polymer. The pH may be adjusted by any suitable means such as by adding an acid or base. In embodiments, the pH of the aqueous solution is from 7 to 14, alternatively from 7 to 13, and alternatively from 9 to 14, further alternatively from 9 to 13, and alternatively from 7 to 9, and in some alternative embodiments the pH is 9.

In embodiments, a pH 7 water-based solution has about 1 wt. % branched polyethylenimine (BPEI) and about 1 wt. % poly(sodium phosphate) [PSP]. Soaking a cotton fabric in such solution for about five minutes resulted in about a 12.5 wt. % gain. In embodiments, soaking a cotton fabric in such solution for about 30 minutes resulted in about a 23 wt. % gain. With the lower gain, a portion of the fabric passed the vertical burn test (i.e., UL-94). With the 23 wt. % gain, substantially all of the fabric would not ignite during VFT.

Without limitation, about 12.5 wt. % of BPEI-PSP complex was deposited onto cotton fabric with a single five minute soak, which was much faster and less complicated than conventional methods. Further, without limitation, the effectiveness of the system is also better than competing brominated technologies applied at similar concentrations (or weight).

In some embodiments, the fire retardant coating is optically transparent or partially optically transparent.

Without being limited by theory, the fire retardant coating covers the internal walls of the pores of the substrate without blocking the pores. For instance, in an embodiment in which the substrate is a fabric comprising threads, the thin film coating method may individually coat at least a portion or substantially all of each thread with the fire retardant coating. Further, without being limited by theory, coating each thread provides flame retardancy to the substrate but allows the threads to remain soft and flexible.

Further, without being limited by theory, the thin film coating method provides a flame retardant (i.e., melamine polyphosphate) that sticks to the substrate due to the complex formation with polyethylenimine. The thin film coating method is an industrially attractive method to form an unreactive safe flame retardant directly on the surface with a substrate without using critical chemicals or special equipment. For instance, a polyester-cotton blend that is typically used for clothing is self-extinguishing. Moreover, the thin film coating method may not have an influence on the structural integrity of the substrate. In addition, the thin film coating method may provide an environmentally-benign and halogen-free flame retardant coating.

In an embodiment, the thin film coating method provides a complex formation of polyethylenimine with phosphate groups, which are not occupied with a melaminium counterion. Such complexation process, introduced by changing the pH of the system using a buffer solution, functions as an adhesive between the melamine polyphosphate and the substrate and may also have synergistic influence on the flame retardation.

In embodiments, a typical roll-to-roll coater, used for any dip coating of fabrics, may be modified with a drying tunnel and the sufficient number of baths to realize the thin film coating method for fabrics. In some embodiments, spray coating may be used in instead of immersion coating (i.e., bath coating) and a similar apparatus may be used for foam. For instance, foam may be transported through the dipping solutions by a conveyor and may be squeezed between rolls to remove excess liquid.

In other embodiments, small scale fabric samples (e.g., up to 13 inches by 13 inches) have been coated with the thin film coating method and exhibit improved flame retardant properties. For instance, a polyester-cotton blend, containing 35% cotton, passed the vertical flame test with a weight addition of less than 20% coating.

To further illustrate various illustrative embodiments of the present disclosure, the following examples are provided.

EXAMPLES

Example

Materials:

Bleached, de-sized cotton print cloth (i.e., fabric) with an approximate weight of 100 g m$^{-2}$ was purchased from Testfabrics, Inc (West Pittston, Pa.). Poly(phosphate sodium salt) (crystalline, +200 mesh, 96%) and branched polyethylenimine (molecular weight, Mw ~25,000 g mol$^{-1}$) were used to create the OnePot system. Such materials were used as received. 1 M NaOH (made from sodium hydroxide pellets, anhydrous; reagent grade, ≥98%) and 2 M HCl (made from hydrochloric acid; ACS reagent, 37%) were used to adjust the pH of the deposition solutions. All chemicals were purchased from Sigma-Aldrich (Milwaukee, Wis.).

Microscopic Imaging:

Coated thin films, deposited on cotton substrates, were mounted on aluminum imaging stubs and thinly sputter-coated with 5 nm of platinum/palladium (Pt/Pd) alloy in preparation for surface images that were acquired with a field-emission scanning electron microscope (FESEM, Model JSM-7500F, JEOL; Tokyo, Japan).

OnePot Deposition:

All individual solutions were prepared with 18.2 MΩ deionized water and were rolled overnight to ensure complete dissolution. The pH of 2.0 wt. % PSP and 1.0 wt. % PEI aqueous solutions were altered to 7 using 1 M NaOH and 2 M HCl, respectively. Cotton fabric was coated in a pan large enough for the fabric to lay flat. The OnePot mixture was created by pouring 1 kg of prepared PEI solution into the coating basin that already contained 1 kg of prepared PSP solution. It should be noted that 2.0 wt. % PSP solution is clear and 1.0 wt. % PEI solution is transparent, with a slight yellow hue. When mixed, the solution immediately turned turbid (cloudy white), which suggested that complexation had occurred. As soon as PEI was poured into the basin, the timer count began from zero. In each case, the solution was 30 minutes old at the end of soaking. The term "soak time" denoted the time that the fabric was in the PSP/PEI mixture. To determine when the fabrics were submerged into the mixture, the reported soak time was subtracted from 30 minutes. After being submerged in pH 2 water for 5 minutes, the fabric was removed, wrung out, stretched over the coating holder, and placed into the OnePot mixture at the specified time (see FIGS. 1(a)-(e) for the soak time diagram). The purpose of the holder was to keep the fabric parallel to the coating basin. The 2 kg mixture completely covered the submerged fabric. At the conclusion of the soak time, which always occurred when the mixture was 30 minutes old, the fabric was removed, wrung out, and rinsed in deionized water. Fabrics were hung to dry in a 70° C. oven for 3 hours and stored in dry box prior to further testing.

Thermal Stability, Flammability, and Combustibility of Fabric:

Thermal stability of control fabric and OnePot coated cotton samples (approximately 30 mg) were evaluated in triplicate using a Q-50 thermogravimetric analyzer (TA Instruments, New Castle, Del.) under a controlled heating ramp of 20° C. min$^1$, from ambient temperature up to 600° C. Coated and control samples were cut into 3×12 in. strips, and vertically hung in a metal clamp within a model VC-2 vertical flame cabinet (Govmark, Farmingdale, N.Y.). Samples were exposed to a small direct flame of a Bunsen burner (situated 40 mm below fabric sample) for 12 seconds to measure time to ignition, time after-flame and after-glow times.

Control cotton and fabric soaked for 1, 5, 10, and 15 min were run in triplicate for micro combustion calorimetry testing at 1° C. sec$^{-1}$ heating rate, from 150-550° C., using method A of ASTM D7309 (pyrolysis under nitrogen) at the University of Dayton Research Institute.

Results and Discussion:

Pouring a branched polyethylenimine (PEI) solution into a basin filled with poly(phosphate sodium salt) (PSP) immediately resulted in turbidity due to the spontaneous formation of macroscopic PSP+PEI complexes. This turbid solution quickly transitioned (<1 min) from its cloudy appearance to one that is uniformly white, suggesting the charge groups in the mixture were kinetically trapped (meaning time and energy was necessary for an equilibrium to be reached), as shown in FIG. 1(a)-(e). Over time, macroscopic separation slowly developed. A clear, water-like supernatant continued to grow as the solution sat. The basin was not agitated in this process in an effort to allow kinetic diffusion to control the complex formation. When this mixture was vigorously stirred, the viscous polymer-rich phase abruptly precipitated to the bottom of the container. Due to the varied and irregular structure of the branched PEI (containing an assortment of primary, secondary and tertiary amine groups), the configuration of the polyelectrolyte complex was not stoichiometrically defined here. Electrostatic attraction and entropy drive the PEC formation, and result in the release of sodium counterions from PSP in exchange for stronger ionic bonding with protonated amine groups on PEI. As polyelectrolyte complex domains grew, charged sites were neutralized and gravity overcame electrostatic and/or steric stabilization resulting in macroscopic phase separation.

The polyethylenimine/poly(phosphate sodium salt) system had two variables that strongly influenced its deposition onto a fabric: solution pot life and soak time. Soaking fabric in longer standing mixtures allowed greater coating pickup to be attained in a shorter time. In this Example, solution pot life was limited to 30 minutes. By submerging fabrics at the latter end of the solution life, the soak time to obtain sufficient coating weight gain was reduced. Fabrics were immersed in the mixture at 15, 20, 25 and 29 minutes after the OnePot system was created, which means they were soaked in the flame retarding solution for 15, 10, 5 and 1 minutes, respectively (see FIGS. 1(a)-(e) for the submersion time diagram and a sequence of pictures demonstrating the coating process). Weight gain of the flame retarding PSP/PEI complexes increased linearly as a function of soak time (FIG. 2(a)). The cotton fabric was presoaked in pH 2 deionized water to increase the positive surface charge on the cellulose. Five swatches of fabric (9.5 in.×16.5 in.) were coated at each soak time, each piece wide enough for two vertical flame test panels (3 in.×12 in.). Coating weight on fabric increased from 2.0-35.0 wt. % as a function of soak time (1-15 minutes). The fabric with weight gain closest to the median coating addition was chosen for micro combustion calorimetry (MCC), scanning electron microscopy (SEM) and thermogravimetric analysis (TGA). SEM micrographs of the control and coated fabric, shown in FIG. 3, illustrated that the weave structure was maintained even with 35.0 wt. % coating addition. The coating appeared to adhere radially around individual fibers. As the coating weight increased, some fiber bridging was observed. For 1, 5, and 10 minute soak times, increased coating weight gain directly corresponded to improved flame retardancy.

Figure 4A:
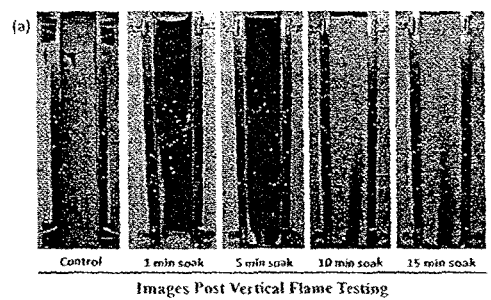
FIG. 4(a) illustrates weight loss as a function of temperature for uncoated (control) fabric and fabric soaked for various times in the PSP/PEI complex, measured in an oxidizing atmosphere.
Figure 4B:
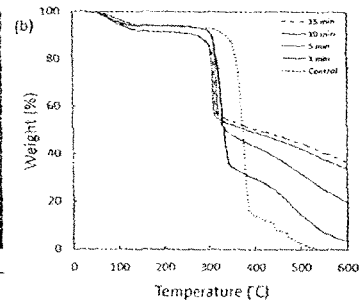
FIG. 4(b) illustrates images of control and coated fabrics after vertical flame testing.

Flame Retardant Behavior of OnePot Nanocoating:

Control fabric and PEI/PSP coated cotton samples were heated from ambient temperature up to 600° C. in oxidizing conditions using a thermogravimetric analyzer at a controlled heating ramp of 20° C. min$^1$. The decreasing slopes on the overlaid thermal curves in FIG. 4(b) indicated mass was lost as a function of temperature. In comparison to the uncoated cotton, coated fabric exhibited an earlier onset degradation temperature. The OnePot nanocoating was designed to alter the combustion cycle of cellulose through the condensed phase mechanism known as intumescence. Since heat initiated this phenomenon and transformed the nanocoating into a swollen, insulating barrier, it was expected (and desired) that the onset degradation temperatures of the coated fabrics occurred prior to that of untreated cotton. At 550° C., the control fabric was completely consumed. Percent residue retained for coated fabrics increased with coating weight, and were greater than the amount of FR nanocoating applied. These results suggested that this combination of intumescent coating, and cellulose were converted into a less combustible material.

Figure 5:
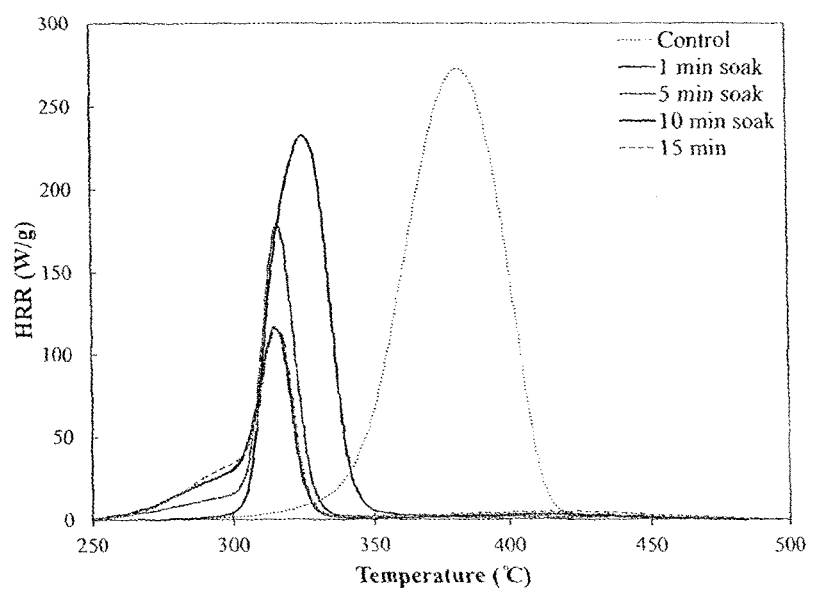
FIG. 5 illustrates heat release rate as a function of temperature, measured with a micro combustion cone calorimeter, for control and one pot coated cotton fabric.

During vertical flame testing (VFT), uncoated cotton ignited, was engulfed in flame, and was completely consumed (see post-test image in FIG. 4 (a)). Ashes along holder edges radiated with afterglow for an average of 21 seconds. None of the coated fabrics exhibited afterglow when the flame was removed. The % residue of VFT samples (9 per soak time) were plotted against % weight gain of the nanocoatings in FIG. 2(b). Fabric soaked for 1 minute (2.3 wt. % average coating) has 18.5 wt. % residue that indicates cotton is incorporated into the char. As shown in FIG. 2(a), 5 minute soaked fabric, with an average of 9.6 wt. % coating, displayed a large standard deviation (~17.7%) for residue, which ranged from 27.4%-87.7%, suggesting this coating weight was near the threshold of passing the standard vertical flame test. Increasing coating weight on fabric corresponded to increasing fire resistance, with maximum benefit occurring at 10 minute soak time (~23.6 wt % coating addition). Flames self-extinguish (i.e., fire propagation was halted) before the test flame was removed on all 10 and 15 minute soaked VFT samples. On average, the char lengths for 10 and 15 minute soak times were 3.2±1.2 in. tall and 2.7±0.9 in. tall, respectively. Table 1 below shows coating weight for the various samples tested.

FIG. 3 shows high resolution micrographs of these fabric samples before and after vertical flame testing, which provide information about how heat and/or direct flame altered the nanocoating. Despite flames propagating up the entire length of OnePot-coated fabrics with weight addition less than or equal to 11.4 wt. %, weave structure was maintained for all coated fabrics post burn. Bubbles were present even at the lowest evaluated soak time (1 minute with 2.3 wt. % coating addition). Post burn images of 10 minute soaked fabric reveals how the coating intumesced around the fibers forming a protective thermal barrier. The weave structure of fabric prepared with 15 minute soak times was indistinguishable as the excess coating swelled, expanded and coalesced over fibers.

Control cotton and fabric samples soaked for 1, 5, 10, and 15 minutes were tested with a micro-combustion calorimeter in effort to measure the heat release rates. Flammability described a material's propensity to ignite and/or combust and was evaluated using "reaction-to-fire tests" under specific heat fluxes. The term heat release described the liberation of heat and was a driving force for fire. The rate at which this exothermic chemical reaction was produced was the heat release rate (HRR) and was used to predict fire hazards of specific materials. Fire typically spreads across cotton fabric very quickly, largely reducing the wearer's ability to remove a clothing item before injury occurs. As observed in TGA (FIGS. 4(a), (b)), MCC data revealed OnePot nanocoatings, regardless of amount, decreased the onset degradation temperature of the fabric relative to uncoated cotton. FIG. 5 shows HRRs plotted as a function of temperature for various cotton samples. Even though the ignition temperature was decreased, all coated fabric reduced peak heat release rates and total heat release, which suggested disruption and alteration of cellulose's combustion cycle. A 1 minute soaked sample, with only 2.3 wt. % coating, effectively constrained the total heat release (52.7%) in comparison to uncoated cotton. Reductions in peak and total heat release reduced the risk of other combustible items being ignited and add time for escape from a hazardous situation. Whereas 5 minute soaked fabrics (10.3 wt % add-on) reduced pkHRR temperatures by 35.0%, 10 minute soaked fabrics (23.3 wt % add-on) reduced pkHRR more than 57.0%. The extra coating achieved by increasing soak time from 5 to 10 minutes yielded nominal increases in char yield (9.5%) and total heat release reduction (4.0%), but significantly dropped the pkHRR (by an additional 34.8%) down to 118 W $g^{-1}$. Although 10 and 15 minute soak times have the lowest peak heat release rate temperatures, a shoulder developed (in the HRR curve) in the temperature range of 250-300° C. (shown as a second pkHRR in Table 1). This shoulder indicated pyrolysis and suggested coating and/or cotton was burning off. The extra coating addition for 15 minutes soaked fabric actually resulted in a slight worsening of overall performance. Fabrics soaked for 5 minutes in the OnePot solution yielded the best performance in an inert atmosphere when evaluations couple processing time and % wt add-on with burn behavior.

Cotton fabric, as depicted in vertical flame and calorimetry testing, was very flammable. Cellulose degraded into a heavy tar between a temperature range of 280-340° C. and then further decomposed into combustible volatiles and char. Vertical flame tests were run in ambient conditions, which allowed for organic materials to be oxidized (i.e., oxygen catalyzed cellulose decomposition). Control fabric subjected to MCC testing, which was performed in an inert atmosphere, was able to retained an average of 7.0 wt. % char that was noticeably shrunk. Residues of all fabrics post VFT and MCC testing were displayed for visual comparison. Coating weight additions up to 23.6 wt. % retained more char (45.0%) and reduced peak heat release rates and total heat release by 57.7% and 77.8%, respectively. Upon the application of heat, the OnePot system applied around cotton fibers transformed into a swollen and expanded thermal barrier of phosphorocarbonaceous cellular material. Elemental analysis of coated fabric post vertical flame testing confirmed the presence of phosphorous, oxygen and carbon (nitrogen was detected in some areas) in the residues. This protection mechanism functioned in the condensed phase as it promoted char formation that locked the fuel source into a non-pyrolyzable thermal insulation. It was believed that the acid source (PSP) degraded the carbon sources (PEI and/or cotton) and induced crosslinking. Amine pendant groups on polyethylenimine decomposed into nitrogen-containing gas and acted as the blowing agent that foamed the forming char. Evidence of swelling and foamed char was clearly demonstrated in SEM micrographs of coated fabric after vertical flame testing (FIG. 3). Increases in char yield in MCC testing quantitatively demonstrated modification of the cellulose degradation pathway and provided evidence of an enhanced thermal barrier upon increasing addition of this nanocoating.

A comparison of intumescent nanocoatings on cotton (OnePot, PAAm/PSP, and PA/CH) was shown in Table 1. Due to differing test temperature ranges (150-550° C., 200-600° C., 200-700° C., respectively), char yield between sample sets was not directly comparable. However, all of these systems achieved heat release rates near zero at high temperature, which validated the comparison of pkHRR and THR between the present polyelectrolyte complex (OnePot) and the layer-by-layer coated assemblies (PAAm/PSP and PA/CH). Fabrics coated with 20 BLs of PAAm/PSP (the first all-polymer intumescing system created via LbL) reduced pkHRR to ~92 W $g^{-1}$ (63.6% reduction) and THR to ~3.8 kJ $g^{-1}$ (67.5% reduction) with 17.5 wt. % coating. Fabrics coated with 32 BLs of PA/CH (the first renewable polyelectrolyte intumescing multilayer system) were able to achieve similar reduction in pkHRR (~100 W $g^{-1}$, 61.4% reduction) and THR (2.8 kJ $g^{-1}$, 76.7% reduction) with ~18% coating addition. If coated by hand, it would take approximately 68 minutes to coat 20 BLs and 104 minutes to coat 32 BLs using the procedure described in this example Fabric soaked for 10 minutes in the mixture reduced the pkHRR down to 118 W $g^{-1}$ (57.7% reduction) and THR to 2.7 kJ $g^{-1}$ (78.0% reduction) with 23.6 wt. % coating addition. These PSP/PEI complexes deposited on cotton fabric in one-step, drastically diminishing the processing time without sacrificing flame retarding performance.

CONCLUSION

Weak polyelectrolyte complexes formed from branched polyethylenimine and sodium hexametaphosphate deposited on cotton fabric as a function of time in the mixture and solution pot life (which was created upon pouring polycation solution into the basin containing polyanion solution). Fabrics soaked into this aqueous flame retarding mixture for 1, 5, 10, and 15 minutes created nanocoatings with average weight additions of 2.3%, 10.3%, 23.2%, and 35.1% (5 fabric samples were evaluated per soak time, each wide enough for two vertical flame test panels). Flame retarding behavior of the OnePot thin films were evaluated via TGA, VFT, and MCC testing. Topography evaluations of the OnePot-coated fabrics prior to VFT indicate the polyion complexes coat around individual fibers and maintained the weave structure of the textile (FIG. 3), and post evaluations evidenced the intumescent phenomenon. The weight gain achieved by 15 minute soak times proved to be unnecessary in VFT testing (produced results identical to fabrics soaked for 10) and even slightly detrimental MCC testing (diminished thermal barrier properties). Fabrics soaked for 1 minute obtained a 2.3 wt. % coating addition, which retained 16.7% residue after vertical flame evaluations and reduced total heat release by 52.7% in comparison to cotton fabric in MCC. Fabrics soaked for 10 minutes self-extinguish during vertical flame testing, and rendered a 57.7% reduction in pkHRR and 77.8% reduction in total HR in comparison to cotton fabric during MCC testing. This coating process was simple, and the setup reduced the length of the processing line, the time to apply the nanocoating, and the base components to create the coating. These all-polymer nanocoatings have exceptional ability to reduce fire risk. The OnePot deposition procedure provides a commercially viable solution for rendering textiles flame retardant.

TABLE I

MCC Results for Uncoated Control and OnePot Coated Cotton Fabric.

| OnePot | Wt Gain [%] | Char Yield [wt %] | pkHRR [W g⁻¹] | pkHRR [W g⁻¹] | pkHRR T [° C.] | Total HR [kJg⁻¹] | Total HR Reduction [%] |
|---|---|---|---|---|---|---|---|
| Control | — | 7.0 ± 0.2 | — | 279 ± 5.7 | 383 ± 0.8 | 12.3 ± 0 | — |
| 1 min soak | 2.3 | 26.5 ± 1.4 | — | 231 ± 2.6 | 324 ± 1.0 | 5.8 ± 0.1 | 52.7 ± 1.0 |
| 5 min soak | 10.3 | 41.1 ± 1.1 | 9 ± 0 | 181 ± 3.5 | 317 ± 0.6 | 3.1 ± 0 | 74.8 ± 0 |
| 10 min soak | 23.2 | 45.0 ± 0.7 | 18 ± 1.2 | 118 ± 2.9 | 315 ± 2.0 | 2.7 ± 0.1 | 77.8 ± 0.5 |
| 15 min soak | 35.1 | 44.3 ± 1.2 | 22 ± 2.0 | 120 ± 11.2 | 315 ± 1.0 | 2.9 ± 0.1 | 76.2 ± 0.9 |

| PAAm/PSP | Wt Gain [%] | Char Yield [wt %] | pkHRR [W g⁻¹] | pkHRR T [° C.] | Total HR [kJg⁻¹] | Total HR Reduction [%] |
|---|---|---|---|---|---|---|
| Control | — | 9.59 ± 0.61 | 253 ± 8.2 | 400 ± 1.3 | 11.7 ± 0.23 | — |
| 5 BL | 1.6 | 23.83 ± 1.96 | 146 ± 14.5 | 306 ± 2.7 | 5.8 ± 0.4 | 54.4 |
| 10 BL | 6.0 | 31.43 ± 0.06 | 97 ± 7.1 | 303 ± 4.7 | 2.9 ± 0.12 | 75.2 |
| 20 BL | 17.5 | 31.07 ± 0.38 | 92 ± 16.2 | 307 ± 4.7 | 3.8 ± 0.17 | 67.5 |
|  |  |  | 17 ± 2.1 | 415 ± 1.2 |  |  |

| PA/CH – pH 4 | Wt Gain [%] | Char Yield [wt %] | pkHRR [W g⁻¹] | pkHRR T [° C.] | Total HR [kJg⁻¹] | Total HR Reduction [%] |
|---|---|---|---|---|---|---|
| Control | — | 5.6 ± 0.1 | 259 ± 6.7 | 382 ± 2.1 | 12.0 ± 0.1 | — |
| 32 BL | 18.0 | 42.4 ± 0.3 | 100 ± 1.8 | 313 ± 0.8 | 2.8 ± 0.1 | 76.7 |

Although the present disclosure and its advantages have been described in detail, it should be understood that various changes, substitutions and alterations may be made herein without departing from the spirit and scope of the disclosure as defined by the appended claims.

What is claimed is:

1. A method for coating a substrate to provide a flame resistant, coated substrate, comprising:
   (A) preparing an aqueous solution, wherein the aqueous solution comprises a phosphate material, a cationic material, and a water;
   (B) exposing the substrate to the aqueous solution to produce a coating on the substrate, wherein the coating comprises the cationic material and the phosphate material; and
   (C) exposing the coating on the substrate to a solution comprising an amine, amide, or combinations thereof.

2. The method of claim 1, wherein the aqueous solution comprises from about 0.01 wt. % cationic materials to about 30.0 wt. % cationic materials.

3. The method of claim 1, wherein the aqueous solution comprises from about 0.01 wt. % phosphate materials to about 30.0 wt. % phosphate materials.

4. The method of claim 1, wherein the substrate is exposed to the aqueous solution from about 1 second to about 24 hours.

5. The method of claim 1, wherein the coated substrate has between about 5.0 wt. % coating and about 25 wt. % coating.

6. The method of claim 1, wherein the coating is between about 10 nanometers and about 1,000 nanometers thick.

7. The method of claim 1, wherein the substrate comprises foam, fabric, leather, vinyl compounds, plastic, glass, ceramic, metal, wood, carpet, hook and loop fasteners, non-foam padding, lapis, ducts, or any combinations thereof.

8. The method of claim 1, wherein the aqueous solution further comprises an anionic material.

9. The method of claim 8, wherein the anionic material comprises an anionic polymer, a colloidal particle, a sulfated molecule, a boronic acid, a boron containing acid, or any combinations thereof.

10. The method of claim 1, wherein the phosphate material comprises polysodium phosphate, ammonium phosphate, ammonium polyphosphate, sodium hexametaphosphate, or any combinations thereof.

11. The method of claim 10, wherein the phosphate material comprises polysodium phosphate.

12. The method of claim 1, wherein the cationic material comprises a polymer, a colloidal particle, a nanoparticle, a nitrogen-rich molecule, or any combinations thereof.

13. The method of claim 12, wherein the polymer comprises a cationic polymer, a polymer with hydrogen bonding, or any combinations thereof.

14. The method of claim 13, wherein the cationic polymer comprises branched polyethylenimine, cationic polyacrylamide, cationic poly diallyldimethylammonium chloride, poly (melamine-co-formaldehyde), polymelamine, a copolymer of polymelamine, polyvinylpyridine, a copolymer of polyvinylpyridine, or any combinations thereof.

15. The method of claim 1, wherein (C) comprises exposing the coating on the substrate to the solution comprising an amine, amide, or combinations thereof, exposing the coating on the substrate to a buffer solution, or both.

16. The method of claim 1, further comprising (D) exposing the coating on the substrate to a buffer solution.

17. The method of claim 16, further comprising (E) curing the coating on the substrate.

18. The method of claim 1, wherein the coating further comprises an additive.

19. The method of claim 18, wherein the additive comprises a crosslinker.

20. The method of claim 1, wherein the solution comprising an amine, amide, or combinations thereof is a buffer solution.

* * * * *